United States Patent
Kamimori

(10) Patent No.: US 7,680,009 B2
(45) Date of Patent: Mar. 16, 2010

(54) OPTICAL DISC REPRODUCING APPARATUS PERFORMING EQUALIZER ADJUSTMENT

(75) Inventor: Yutaka Kamimori, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 840 days.

(21) Appl. No.: 11/148,196

(22) Filed: Jun. 9, 2005

(65) Prior Publication Data

US 2005/0276193 A1 Dec. 15, 2005

(30) Foreign Application Priority Data

Jun. 11, 2004 (JP) .......................... P2004-173407

(51) Int. Cl.
*G11B 7/00* (2006.01)
(52) U.S. Cl. ................. 369/53.34; 369/47.17
(58) Field of Classification Search ............. 369/44.32, 369/53.1, 53.12, 53.13, 53.15, 53.16, 53.17, 369/53.35
See application file for complete search history.

(56) References Cited

U.S. PATENT DOCUMENTS

| 5,848,036 | A | * | 12/1998 | Ishibashi et al. | ......... | 369/44.29 |
| 6,680,887 | B2 | * | 1/2004 | Shihara et al. | ........... | 369/44.32 |
| 7,154,827 | B2 | * | 12/2006 | Tokita et al. | ............. | 369/47.53 |
| 7,277,365 | B2 | * | 10/2007 | Yasuda et al. | ............ | 369/44.27 |
| 2002/0044506 | A1 | * | 4/2002 | Shihara et al. | ........... | 369/44.32 |

FOREIGN PATENT DOCUMENTS

| JP | 09-044997 | 2/1997 |
| JP | 10-69657 | 3/1998 |
| JP | 2001-023167 | 1/2001 |
| JP | 2001-332028 | 11/2001 |
| JP | 2002-008243 | 1/2002 |
| JP | 2002-343023 | 11/2002 |
| JP | 2003-233917 | 8/2003 |

* cited by examiner

*Primary Examiner*—Hoa T Nguyen
*Assistant Examiner*—Mark Fischer
(74) *Attorney, Agent, or Firm*—Morgan, Lewis & Bockius LLP

(57) ABSTRACT

An optical disc reproducing apparatus has a function of setting a cutoff frequency and a boost amount of a read out signal from an optical disc and performing equalizer adjustment, and includes a system controller for searching for an optimal jitter value by simultaneously changing a cutoff frequency and a boost amount to thereby set positions of jitter measuring points determined on a coordinate plane whose abscissas represent cutoff frequencies and whose ordinates represent boost amounts, and by moving the measuring points.

1 Claim, 10 Drawing Sheets

OPTICAL DISC REPRODUCING APPARATUS PERFORMING EQUALIZER ADJUSTMENT

BACKGROUND OF THE INVENTION

1. Field of the Invention

The present invention relates to an optical disc reproducing apparatus for reproducing information recorded on an optical disc and, more particularly, to an optical disc reproducing apparatus having a function of performing equalizer adjustment therein.

2. Description of the Related Art

As has hitherto been known, in an optical disc reproducing apparatus for reproducing information recorded on an optical disc, such as a CD (compact disk) or a DVD (digital versatile disk), equalizer adjustment is performed so as to compensate deterioration in the waveform of an RF signal, which is a reproducing signal that is electrically read and represents the information recorded on the optical disc. The RF signal contains various frequency components. The higher the frequency thereof, the lower the level thereof. In a case where the levels of the components remain low, jitter of the RF signal increases and gets worse. Also, the frequency components other than necessary frequency components lead to the deterioration of the jitter. Thus, the equalizer adjustment, that is, the adjustment of the frequency characteristics of the RF signal is performed by boosting the low-level frequency components and cutting off the components, whose frequencies are higher than a certain frequency, so as to reduce (or improve) the jitter.

The equalizer adjustment is performed by combining both the adjustment of a cutoff frequency and that of a boost amount. The adjustment of a cutoff frequency is to determine a frequency point at which attenuation of the level of frequency components of an RF signal, which have frequencies that is higher or lower than this frequency point or that is within a certain range including this frequency point, by, for example, 3 dBs from a reference level. The adjustment of a boost amount is to determine an amount by which a gain is increased by boosting an RF signal at frequencies around a certain frequency.

FIG. 8 is a flowchart illustrating the equalizer adjustment in a conventional optical disc reproducing apparatus. The equalizer adjustment is described hereinbelow with reference to this flowchart.

First, at the equalizer adjustment in a case where an optical disc loaded in the optical disc reproducing apparatus is a DVD or a CD, the apparatus commences a still operation of causing a pause state (that is, a state caused when the optical pickup jumps a track and stops after the optical disc makes one revolution) in which an optical pickup is halted at a specific track (or address) on the optical disc in step N1. When it is judged in step N2 that the apparatus is ready for measuring jitter, that is, jitter can be measured, the setting of a jitter measuring circuit provided in an LSI (Large-Scale Integration) constituting a digital signal processing portion for performing signal processing in the apparatus is performed in step N3. This setting of the jitter measuring circuit is that of a circuit enabled to measure jitter in the LSI (that is, the setting of a circuit for performing equalizer adjustment on an RF signal outputted from the optical pickup, which is not converted into a digital signal yet, according to the optical disc).

Jitter is a value (%) that is generally used to evaluate a signal of optical discs. As the jitter increases, the quality of the signal lowers.

Subsequently to step N3, the apparatus proceeds to step N4, whereupon a first search for an optimum cutoff frequency Fc is performed. FIG. 9A illustrates this first search for an optimum cutoff frequency Fc.

As shown in FIG. 9A, it is decided in step N31 which of a DVD and a CD the loaded optical disc is. If the optical disc is a DVD, initialization corresponding to a DVD is performed in step N32. On the other hand, if the optical disc is a CD, initialization corresponding to a CD is performed in step N33.

That is, the apparatus sets a range in which the cutoff frequency Fc is searched for. A start point in this range is set to be an initial value. Then, the cutoff frequency Fc is set at the set initial value in step N34.

Thereafter, jitter is measured in step N35. Then, it is decided in step N36 whether the measured jitter is less than a predetermined optimal jitter. If so, the measured jitter is stored as the optimal jitter in step N37. Upon completion of processing in this step N37, or if the measured jitter is or more than the optimal jitter, a point for searching for the next cutoff frequency Fc is determined in step N38. Similarly, jitter is measured in step N35. If the measured jitter is less than the optimal jitter in step N36, the measured jitter is stored as the optimal jitter in step N37. Such a process is repeated until measurement of jitter corresponding to the last cutoff frequency Fc is performed. Thus, plural jitter values are stored. If processing corresponding to the last cutoff frequency Fc is finished in step N39, a first search for the optimal cutoff frequency Fc, shown in FIG. 9B, is finished in step N40.

Turning back to step N5 shown in FIG. 8, a second search for an optimal cutoff frequency and a boost amount is performed only on a CD. FIG. 10 shows a flowchart illustrating the second search for an optimal cutoff frequency and a boost amount BA that is shown in FIG. 9C.

As shown in FIG. 10, it is decided in step N51 which of a DVD and a CD an optical disc for use in equalizer adjustment is. If the optical disc is a CD, initialization corresponding to a CD is performed in step N52. That is, a range, in which a cutoff frequency is searched for, is set in such a way as to have a certain width from a point, at which the searched cutoff frequency Fc corresponding to the optimal jitter is searched for, so as to search for a cutoff frequency Fc. Also, a range, in which a boost amount is searched for, is set so as to search for a boost amount. Thereafter, a search start point is set in the range in which the cutoff frequency Fc is searched for. Also, a search start point is set in the range in which the boost amount is searched for.

Subsequently, the cutoff frequency Fc is set at the search start point (as an initial value), which has been set as described above, in step N53. Then, jitter is measured in step N54. It is decided in step N55 whether the measured jitter is less than the optimal jitter. If so, the measured jitter is stored as the optimal jitter. Thus, an optimal cutoff frequency and an optimal boost amount at that time are obtained in step N56.

Upon completion of processing in this step N56, or if the measure jitter is or more than the optimal jitter, a search point for searching for the next cutoff frequency Fc is set in step N57. Similarly, jitter is measured in step N54. If this measured jitter is less than the optimal jitter in step N55, the measured jitter is stored as the optimal jitter in step N56.

Such a process is repeated until measurement of jitter corresponding to the last cutoff frequency Fc is performed. Thus, plural jitter values are stored. If processing corresponding to the last cutoff frequency Fc is finished in step N58, a next boost amount is determined in step N59. Upon completion of processing corresponding to the last boost amount in step N60, this second search for the optimal cutoff frequency Fc is finished in step N61. The apparatus returns to step N5 shown in FIG. 8. Then, the setting of the circuit for measuring jitter is canceled in step N6. Thus, this equalizer adjustment is finished in step N7.

JP-A-2002-343023, JP-A-2002-8243, JP-A-9-44997 and JP-A-2001-23167 disclose such techniques.

SUMMARY OF THE INVENTION

In the conventional optical disc reproducing apparatus, as described above, the range, in which the cutoff frequency is searched for, is set so as to search for the cutoff frequency.

Also, the range, in which the boost amount is searched for, is set so as to search for the boost amount. Thereafter, the search start point is set in the range, in which the cutoff frequency is searched for. Also, the search start point is set in the range, in which the boost amount is searched for.

Thus, the conventional apparatus has caused the problem that the equalizer adjustment is very time-consuming. That is, the conventional optical disc reproducing apparatus has caused the problem that the equalizer adjustment is very time-consuming, because the equalizer adjustment is performed by varying the cutoff frequency and the boost amount separately from each other.

Incidentally, according to each of the conventional techniques respectively disclosed in JP-A-2002-343023, JP-A-2002-8243, JP-A-9-44997 and JP-A-2001-23167, the equalizer adjustment is performed by varying the cutoff frequency and the boost amount separately from each other. Thus, each of the conventional techniques has caused the problem that the equalizer adjustment is very time-consuming.

The invention is accomplished so as to solve the aforementioned problem. Accordingly, an object of the invention is to provide an optical disc reproducing apparatus having the functions of absorbing deviations of a cutoff frequency and a boost amount and of achieving optimal equalizer adjustment on each optical disc.

To achieve the foregoing object, according to an aspect of the invention, there is provided an optical disc reproducing apparatus having a function of setting a cutoff frequency and a boost amount of a reproducing signal from an optical disc and performing equalizer adjustment. This optical disc reproducing apparatus (hereunder referred to as a first optical disc reproducing apparatus) features that the first optical disc reproducing apparatus comprises the following system controller for searching for an optimal jitter value by simultaneously changing a cutoff frequency and a boost amount to thereby perform equalizer adjustment. This system controller comprises optical pickup setting unit for causing an optical pickup to seek a predetermined address on an optical disc so as to measure jitter and for setting the optical pickup in a pause state, measuring point setting unit for sequentially setting at least two points, which are located on a coordinate plane whose abscissas represent cutoff frequencies and whose ordinates represent boost amounts, as measuring points at each of which jitter is measured, for setting one of the measuring points as a reference search point, and for setting the other measuring point at a position displaced by a set value from the reference search point, first jitter bottom judging unit for judging, when a difference between a jitter value at one of the measuring points and a jitter value at the other measuring point is within a predetermined range, that both the measuring points are placed at a bottom of a jitter coordinate space, first adjustment value setting unit for setting, when it is judged that both the measuring points are placed at the bottom of the jitter coordinate space, a jitter value at the measuring point, which jitter value is better than that at the other measuring point, as an equalizer adjustment value, measuring point moving unit for moving, when a difference between a jitter value at one of the measuring points and a jitter value at the other measuring point is outside a predetermined range, the measuring point, the measured jitter value of which is larger than the measured jitter value of the other measuring point, between the measuring points by a set value, second jitter bottom judging unit for judging, when a difference between a jitter value at one of the measuring points and a jitter value at the other measuring point is within a predetermined range, that both the measuring points are placed at a bottom of a jitter coordinate space, and second adjustment value setting unit for setting, when it is judged that both the measuring points are placed at the bottom of the jitter coordinate space, a jitter value at the measuring point, the jitter at which is better than that at the other measuring point, as an equalizer adjustment value.

In this optical disc reproducing apparatus, first, the optical pickup is caused by the optical pickup setting unit to seek a predetermined address on an optical disc and to be set in a pause state. Then, one of the two measuring points is set by the measuring point setting unit as the reference search point. The other measuring point is set at the position displaced by the set value from the reference search point. In a case where the difference between the jitter value at the one of the measuring points and the jitter value at the other measuring point is within a predetermined range, it is judged by the first jitter bottom judging unit that both the measuring points are placed at the bottom of the jitter coordinate space.

In this case, the jitter value at the measuring point, which is better than the jitter value at the other measuring point, is set by the first adjustment value setting unit as the equalizer adjustment value.

In a case where the difference between the jitter value at the one of the measuring points and the jitter value at the other measuring point is outside a predetermined range, between both the measuring points, the measuring point, the jitter value at which is larger than the jitter value at the other measuring point, is moved by the preset value. In a case where the difference between the jitter value at the moved measuring point and the jitter value at the other measuring point is within the predetermined range, it is judged by the second jitter bottom judging unit that both the measuring points are placed at the bottom of the jitter coordinate space. In a case where it is judged that both the measuring points are placed at the bottom of the jitter coordinate space, the jitter value at the measuring point, which is better than that at the other measuring point, is set by the second adjustment value setting unit as the equalizer adjustment value.

With this configuration, the measuring points are determined by the points located on the coordinate plane, whose abscissas represent cutoff frequencies and whose ordinates represent boost amounts. Consequently, the movement of the measuring point results in the simultaneous change of the cutoff frequency and the boost amount. Thus, the number of times of measurement can be reduced by simultaneously changing the cutoff frequency and the boost amount. Optimal jitter can be searched for. Deviations of the cutoff frequency and the boost amount of a circuit can be absorbed. Optimal equalizer adjustment can be performed on each optical disc in a short time.

According to another aspect of the invention, there is provided an optical disc reproducing apparatus (hereunder referred to as a second optical disc reproducing apparatus) having a function of setting a cutoff frequency and a boost amount of a reproducing signal from an optical disc and performing equalizer adjustment. The second optical disc reproducing apparatus features that this optical disc reproducing apparatus comprises a system controller for searching for an optimal jitter value by simultaneously changing a cutoff frequency and a boost amount to thereby set positions of jitter measuring points determined on a coordinate plane whose abscissas represent cutoff frequencies and whose ordinates represent boost amounts, and by moving the measuring points.

In this optical disc reproducing apparatus, the positions of the jitter measuring points on the coordinate plane can be set by simultaneously changing the cutoff frequency and the boost amount. An optimal jitter value can be searched for by moving the measuring points.

With this configuration, the measuring points are determined by the points located on the coordinate plane, whose abscissas represent cutoff frequencies and whose ordinates represent boost amounts. Consequently, the movement of the measuring point results in the simultaneous change of the cutoff frequency and the boost amount. Thus, the number of times of measurement can be reduced by simultaneously changing the cutoff frequency and the boost amount. Optimal jitter can be searched for. Deviations of the cutoff frequency and the boost amount of a circuit can be absorbed. Optimal equalizer adjustment can be performed on each optical disc in a short time.

An embodiment (hereunder referred to as a third optical disc reproducing apparatus) of the second optical disc reproducing apparatus features that the system controller causes an optical pickup to seek a predetermined address on an optical disc for measuring jitter, and sets the optical pickup in a pause state, that the system controller sequentially provides at least two points, which are located on a coordinate plane whose abscissas represent cutoff frequencies and whose ordinates represent boost amounts, as measuring points at each of which jitter is measured, that when a jitter difference in jitter between the two measuring points is within a predetermined range, the system controller sets a jitter value at the measuring point, which is better than that at the other measuring point, as an equalizer adjustment value, and that when the jitter difference is outside the predetermined range, the system controller moves one of the measuring point, and sets a jitter value at the measuring point, which is better than that at the other measuring point, as an equalizer adjustment value in a case where a difference between the jitter value at the moved measuring point and the jitter value at the other measuring point is within a predetermined range. Thus, an optimal jitter value can be searched for by simultaneously changing the cutoff frequency and the boost amount.

An embodiment (hereunder referred to as a fourth optical disc reproducing apparatus) of the third optical disc reproducing apparatus features that the system controller comprises optical pickup setting unit for causing an optical pickup to seek a predetermined address on the optical disc so as to measure jitter and for setting the optical pickup in a pause state, measuring point setting unit for sequentially setting at least two points, which are located on a coordinate plane whose abscissas represent cutoff frequencies and whose ordinates represent boost amounts, as measuring points at each of which jitter is measured, for setting one of the measuring points as a reference search point, and for setting the other measuring point at a position displaced by a set value from the reference search point, first jitter bottom judging unit for judging, when a difference between a jitter value at one of the measuring points and a jitter value at the other measuring point is within a predetermined range, that both the measuring points are placed at a bottom of a jitter coordinate space, first adjustment value setting unit for setting, when it is judged that both the measuring points are placed at the bottom of the jitter coordinate space, a jitter value at the measuring point, which jitter value is better than that at the other measuring point, as an equalizer adjustment value, measuring point moving unit for moving, when a difference between a jitter value at one of the measuring points and a jitter value at the other measuring point is outside a predetermined range, the measuring point, the measured jitter value of which is larger than the measured jitter value of the other measuring point, between the measuring points by a set value, second jitter bottom judging unit for judging, when a difference between a jitter value at one of the measuring points and a jitter value at the other measuring point is within a predetermined range, that both the measuring points are placed at a bottom of a jitter coordinate space, and second adjustment value setting unit for setting, when it is judged that both the measuring points are placed at the bottom of the jitter coordinate space, a jitter value at the measuring point, the jitter at which is better than that at the other measuring point, as an equalizer adjustment value. Also, the fourth optical disc reproducing apparatus features that the system controller searches for an optimal jitter value by simultaneously changing a cutoff frequency and a boost amount to thereby perform equalizer adjustment. Thus, the measuring points are determined as points located on the coordinate plane whose abscissas represent the cutoff frequencies and whose ordinates represent the boost amounts. The movement of the measuring point results in the simultaneous change of the cutoff frequency and the boost amount. Thus, an optimal jitter value can be searched for by simultaneously changing the cutoff frequency and the boost amount.

As above described, according to the invention, the optical disc reproducing apparatus comprises the following system controller for searching for an optimal jitter value by simultaneously changing a cutoff frequency and a boost amount to thereby perform equalizer adjustment. This system controller comprises optical pickup setting unit for causing an optical pickup to seek a predetermined address on the optical disc so as to measure jitter and for setting the optical pickup in a pause state, measuring point setting unit for sequentially setting at least two points, which are located on a coordinate plane whose abscissas represent cutoff frequencies and whose ordinates represent boost amounts, as measuring points at each of which jitter is measured, for setting one of the measuring points as a reference search point, and for setting the other measuring point at a position displaced by a set value from the reference search point, first jitter bottom judging unit for judging, when a difference between a jitter value at one of the measuring points and a jitter value at the other measuring point is within a predetermined range, that both the measuring points are placed at a bottom of a jitter coordinate space, first adjustment value setting unit for setting, when it is judged that both the measuring points are placed at the bottom of the jitter coordinate space, a jitter value at the measuring point, which jitter value is better than that at the other measuring point, as an equalizer adjustment value, measuring point moving unit for moving, when a difference between a jitter value at one of the measuring points and a jitter value at the other measuring point is outside a predetermined range, the measuring point, the measured jitter value of which is larger than the measured jitter value of the other measuring point, between the measuring points by a set value, second jitter bottom judging unit for judging, when a difference between a jitter value at one of the measuring points and a jitter value at the other measuring point is within a predetermined range, that both the measuring points are placed at a bottom of a jitter coordinate space, and second adjustment value setting unit for setting, when it is judged that both the measuring points are placed at the bottom of the jitter coordinate space, a jitter value at the measuring point, the jitter at which is better than that at the other measuring point, as an equalizer adjustment value. Thus, the points located on the coordinate plane, whose abscissas represent cutoff frequencies and whose ordinates represent boost amounts, are determined as the measuring points. Consequently, when the measuring point is moved, the cutoff frequency and the boost amount simultaneously change. Thus, the number of times of measurement can be reduced by simultaneously changing the cutoff frequency and the boost amount. Optimal jitter can be searched for. Deviations of the cutoff frequency and the boost amount of a circuit can be absorbed. Optimal equalizer adjustment can be performed on each optical disc in a short time.

Also, according to the invention, the optical disc reproducing apparatus has the system controller that sets the positions of jitter measuring points determined by points located on the coordinate plane whose abscissas represent the cutoff frequencies and whose ordinates represent the boost amounts by simultaneously changing the cutoff frequency and the boost amount, and that searches for an optimal jitter value by moving the measuring points. Thus, the measuring points are determined by the points on the coordinate plane whose abscissas represent the cutoff frequencies and whose ordinates represent the boost amounts. Further, the movement of the measuring point results in the simultaneous change of the cutoff frequency and the boost amount. Thus, the number of times of measurement can be reduced.

Optimal jitter can be searched for. Deviations of the cutoff frequency and the boost amount of a circuit can be absorbed.

Optimal equalizer adjustment can be performed on each optical disc in a short time.

Incidentally, the "read out signal" is an RF signal that has not been subjected to equalizer adjustment.

DETAILED DESCRIPTION OF THE PREFERRED EMBODIMENTS

Figure 1:
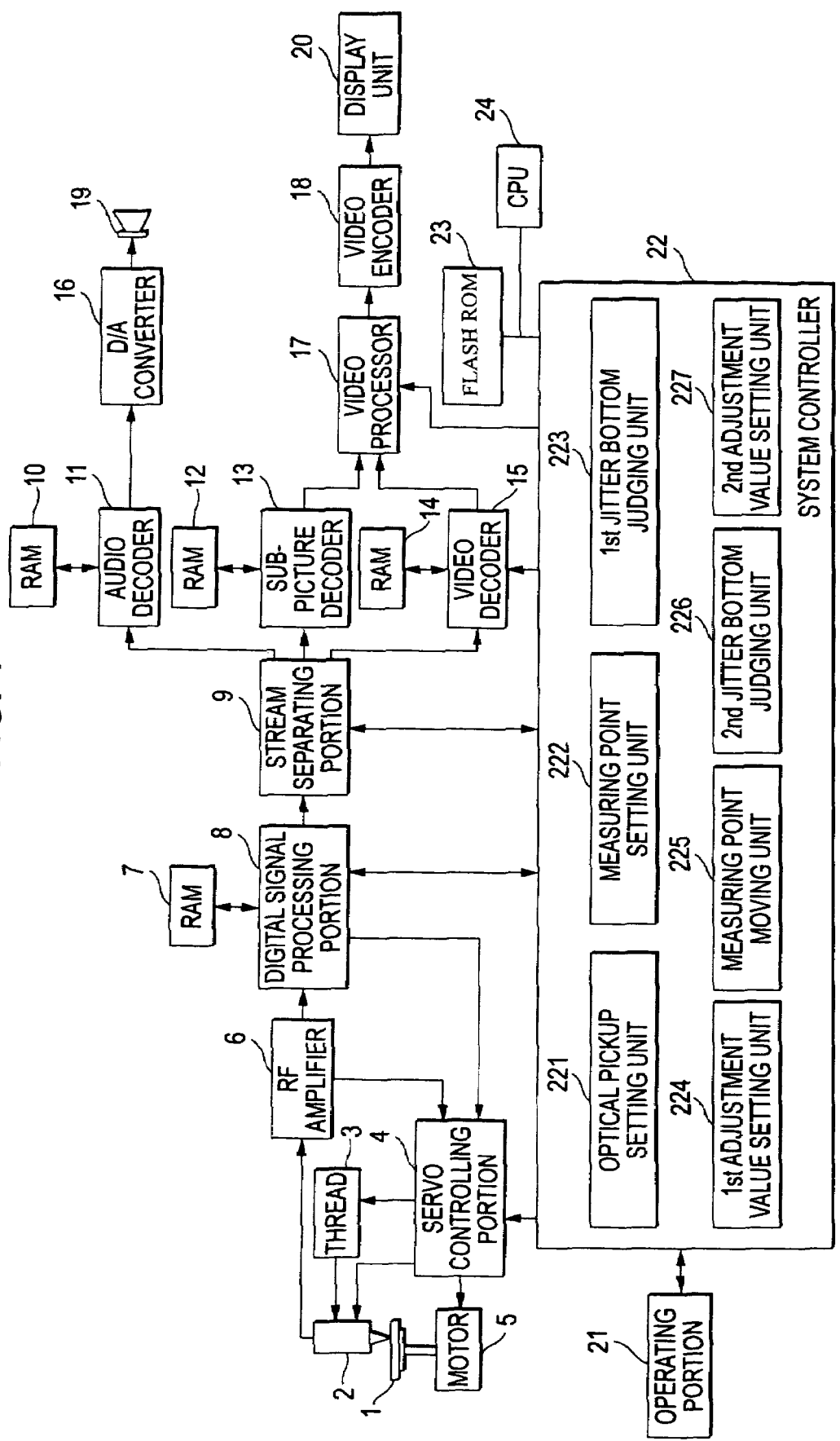
FIG. 1 is a block view illustrating the configuration of an optical disc reproducing apparatus according to an embodiment of the invention.

Hereinafter, an embodiment of the invention is described with reference to the accompanying drawings. FIG. 1 is a block view illustrating the configuration of an optical disc reproducing apparatus according to an embodiment of the invention.

This optical disc reproducing apparatus has a spindle motor 5 for causing an optical disc 1 to rotate, an optical pickup 2 for outputting laser light, which is used for reproducing information recorded on the optical disc 1, and for receiving light reflected from the optical disc 1, a sled 3 for moving this optical pickup 2 in the direction of a radius of an optical disc 1, and a servo control portion 4 for driving the spindle motor 5 and the sled 3 in response to instructions issued by the system controller 22 and for moving a focus position of laser light vertically and horizontally with respect to a recording surface of the optical disc 1 by moving an objective lens (not shown) incorporated in the optical pickup 2.

This optical disc reproducing apparatus also has an RF amplifier 6 for amplifying an RF signal which is a readout signal outputted from the optical pickup 2 when information recorded on the optical disc 1 is reproduced, and also has a digital signal processing portion 8, which converts an RF signal outputted from this RF amplifier 6 into digital data and thereafter generates data by performing signal demodulation and error correction on the digital data according to a data format of the optical disc 1 and stores the generated data in a RAM 7, and also has a stream separating portion 9 that separates audio data, subpicture data, and video data from a data stream outputted from the digital signal processing portion 8 in response to an instruction issued from the system controller 22.

This optical disc reproducing apparatus also has an audio decoder which receives audio data outputted from the stream separating portion 9 and performs a predetermined decode process thereon, and also has the RAM 10 for temporarily storing data so as to perform a decode process in this audio decoder 11, and also has a subpicture decoder 13 for receiving subpicture data outputted from the stream separating portion 9 and for performing a predetermined decode process thereon, a RAM 12 for temporarily storing data so as to cause this subpicture decoder 13 to perform a decode process, a video decoder 15 for receiving video data from the stream separating portion 9 and for performing a predetermined decode process, and a RAM 14 for tentatively storing data so as to cause this video decoder 15 to perform a decode process.

This optical disc reproducing apparatus also has a vide processor 17 for synthesizing data from data, which are outputted from the video decoder 15 and the subpicture decoder 13, in response to an instruction issued from the system controller 22, and also has a video encoder 18 for converting the synthesized data outputted from this video processor 17 into video signals to be displayed and for causing a display unit 20 to display an image, and also has a D/A converter 16 for converting data outputted from the audio decoder 11 into analog audio signals and for supplying the analog audio signals to a speaker 19.

This optical disc reproducing apparatus also has an operating portion 21 provided with various operating keys, such as a reproducing key for giving a reproducing instruction to the system controller 22, and a stop key for giving a stopping instruction to the system controller 22, and also has the system controller 22 for controlling the entire apparatus. Incidentally, the operating portion 21 may be a remote controller.

Alternatively, the operating portion 21 may be provided in an operation panel of an apparatus body.

This optical disc reproducing apparatus also has a flash ROM 23 for storing programs and data, which are used for controlling constituent elements of the apparatus and for controlling the entire apparatus, and also has a CPU 24 for performing computation according to the programs and the data stored in this flash ROM 23 and for controlling the system controller 22.

The system controller 22 also has the following constituent elements as features of this embodiment. That is, the system controller 22 has an optical pickup setting unit 221 for causing the optical pickup 2 to seek a predetermined address on the optical disc 1 so as to measure jitter and for setting the optical pickup 2 in a pause state, a measuring point setting unit 222 for sequentially setting at least two points, which are located on a coordinate plane whose abscissas represent cutoff frequencies and whose ordinates represent boost amounts, as measuring points at each of which jitter is measured, for setting one of the measuring points as a reference search point, and for setting the other measuring point at a position displaced by a set value from the reference search point, a first jitter bottom judging unit 223 for judging, when the difference between the jitter value at one of the measuring points and the jitter value at the other measuring point is within a predetermined range, that both the measuring points are placed at a bottom of a jitter coordinate space, a first adjustment value setting unit 224 for setting, when it is judged that both the measuring points are placed at the bottom of the jitter coordinate space, a jitter value at the measuring point, whose jitter value is better than that at the other measuring point, as an equalizer adjustment value, a measuring point moving unit 225 for moving, when a difference between a jitter value at one of the measuring points and a jitter value at the other measuring point is outside a predetermined range, the measuring point, the measured jitter value of which is larger than the measured jitter value of the other measuring point, between the measuring points by a set value, a second jitter bottom judging unit 226 for judging, when the difference between the jitter value at one of the measuring points and the jitter value at the other measuring point is within a predetermined range, that both the measuring points are placed at the bottom of the jitter coordinate space, and a second adjustment value setting unit 227 for setting, when it is judged that both the measuring points are placed at the bottom of the jitter coordinate space, the jitter value at the measuring point, the jitter at which is better than that at the other measuring point, as an equalizer adjustment value.

Figure 2:
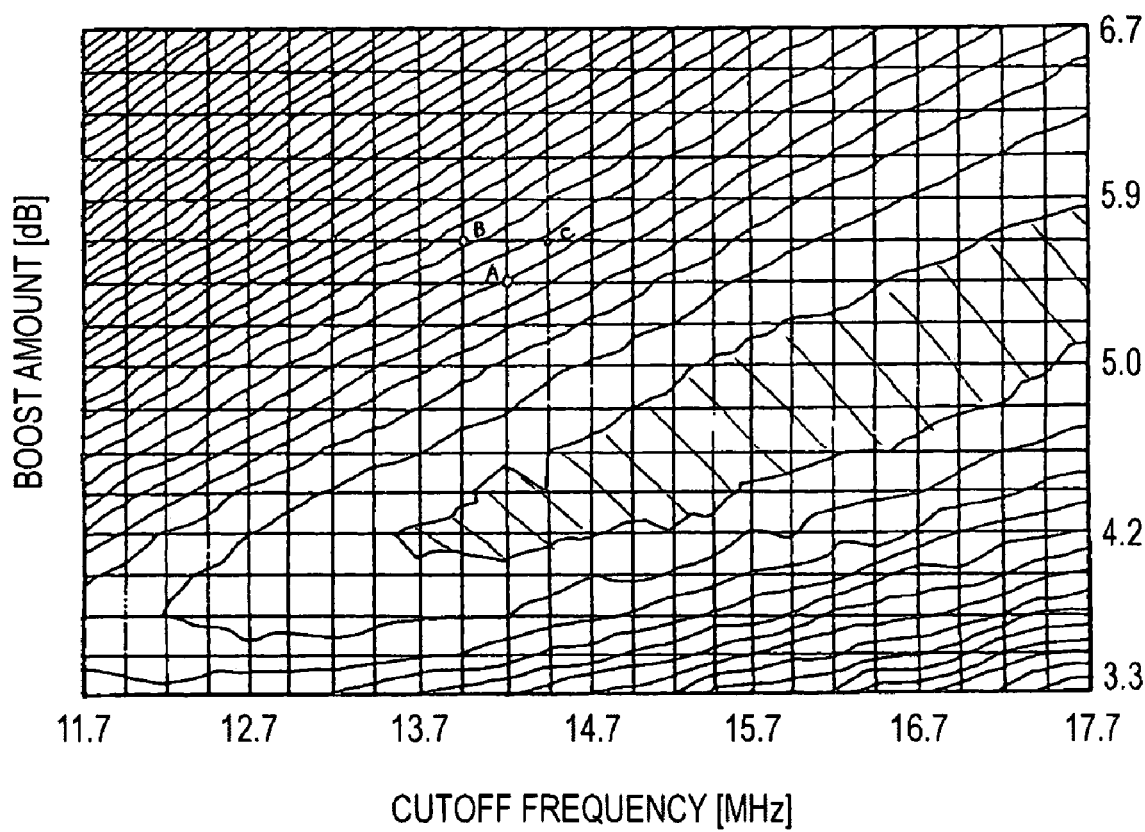
FIG. 2 is a coordinate plan view illustrating the relation between the cutoff frequency and the boost amount of an equalizer in the embodiment.

FIG. 2 is a coordinate plane view illustrating the relation between the cutoff frequency and the boost amount of an equalizer in this embodiment. In FIG. 2, the abscissas represent the cutoff frequencies. The ordinates represent the boost amounts. Contour lines represent jitter levels.

The lower the jitter is, the higher the quality of signal is. The purpose of conducting equalizer adjustment is to determine the cutoff frequency and boost amount of a jitter that is located at the bottom, which is a hatched area in FIG. 2. In this embodiment, the search for the optimal jitter is performed while moving the point on FIG. 2 diagonally.

Figure 3:
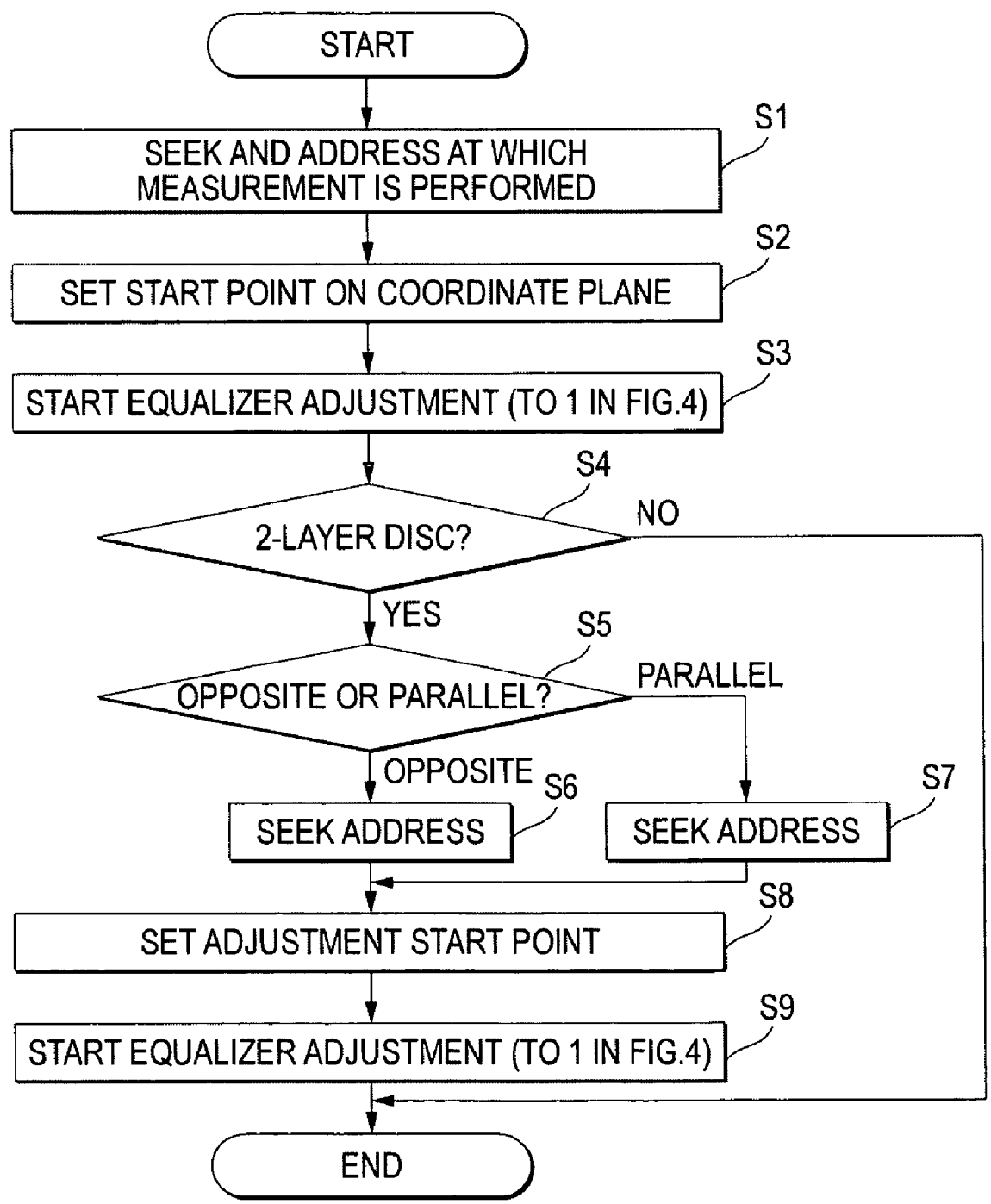
FIG. 3 is a flowchart illustrating an equalizer adjustment process performed in the embodiment.

FIG. 3 is a flowchart illustrating an equalizer adjustment process performed in the optical disc reproducing apparatus according to this embodiment. The equalizer adjustment process is described hereinbelow by referring to this flowchart. Incidentally, an equalizer is included in the digital signal processing portion shown in FIG. 1.

First, in step S1, the optical pickup 2 is caused under the control of the optical pickup setting unit 221 to seek a predetermined address on the optical disc 1 and to be brought into a pause state. Subsequently, an adjustment start point (or a measurement start point) on the coordinate plane shown in FIG. 2 is set by the measuring point setting unit 222 in step S2. Then, equalizer adjustment is started in step S3. Subsequently, the apparatus proceeds to step S31 (to be described later) and performs a process shown in FIG. 4.

Subsequently to the process in step S3, it is judged in step S4 which of a 2-layer disk and a single-layer disk the optical disc is. If the optical disc is a 2-layer disk, it is judged in step S5 which of what is called an opposite structure and what is called a parallel structure the structure of this 2-layer disk is. If the disk has the opposite structure, the optical pickup seeks an address of an adjustment position in step S6. If the disk has the parallel structure, the optical pickup seeks an address of an adjustment position in step S7.

Then, an adjustment start point is set in step S8. Subsequently, equalizer adjustment is started in step S9. Subsequently, the apparatus advances to step S31 (to be described later) and performs the process shown in FIG. 4. If the optical disc is a single-layer disk, the equalizer adjustment is completed in step S3. Thus, the equalizer adjustment is not repeated. The single-layer disk and the 2-layer disk differ from each other in an adjustment value. Therefore, the adjustment values are preliminarily stored in a memory. When information recorded on the optical disc is reproduced, the adjustment value corresponding to the single-layer disk or the 2-layer disk is read from the memory.

Then, the equalizer adjustment is performed by using the read adjustment value.

Figure 4:
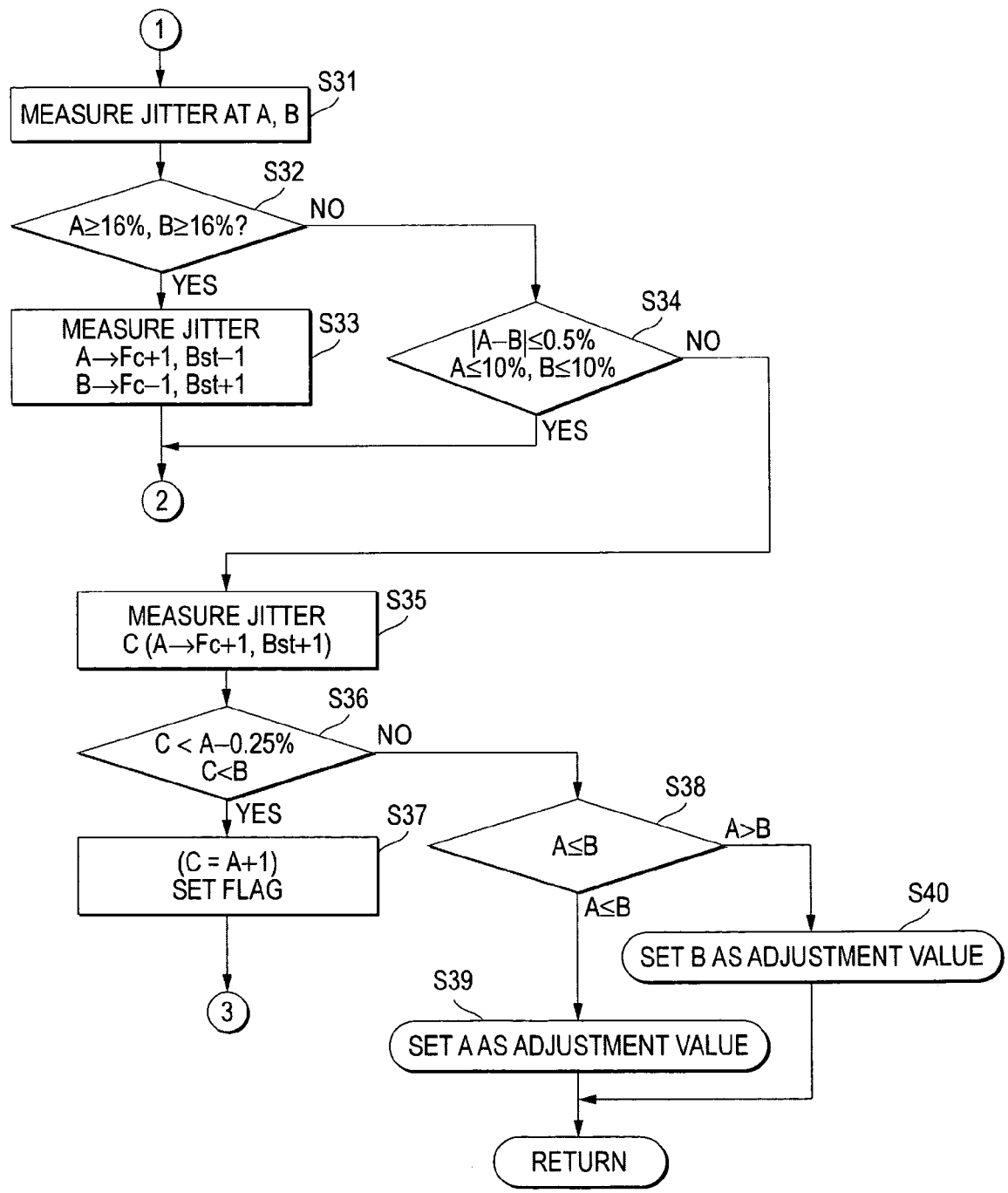
FIG. 4 is a flowchart illustrating a process performed in step S3 shown in FIG. 3 after equalizer adjustment is commenced.

FIG. 4 is a flowchart illustrating the process performed in step S3 shown in FIG. 3 after the equalizer adjustment is started. In step S31, an adjustment start point is set to point A (that is, a certain point shown in FIG. 2). Then, a point, the corresponding cutoff frequency of which is (Fc−1) obtained by subtracting 1 from the cutoff frequency Fc at point A, and the corresponding boost amount of which is (Bst+1) obtained by adding 1 to the boost amount at point A, is set as point B.

Subsequently, it is judged in step S32 whether the jitter at each of the points A and B is equal to or more than about 16%. If the jitter value at each of the points A and B is neither equal to nor more than about 16%, the apparatus proceeds to step S34. If it is decided in step S34 that the difference in jitter between the points A and B is less than 0.5%, and that the jitter value at each of the points A and B is equal to or less than about 10%, the first jitter bottom judging unit 223 judges that the points are placed at the bottom. Then, the better jitter value is set by the first adjustment value setting unit 224 as an equalizer adjustment value in steps S35, S36, S38, S39 and S40.

That is, in step S35, the measuring point is moved by the measuring point moving unit 225, and jitter is measured at a point C, the cutoff frequency at which is obtained by adding 1 to that at the point A and the boost amount at which is obtained by adding 1 to that at the point A. If it is decided in step S36 that the jitter value at the point C is more than a value obtained by subtracting 0.25% from the jitter value at the point A, and that the jitter value at the point C is equal to or more than that at the point B, and if it is decided in step S38 that the jitter value at the point A is equal to or less than the jitter value at the point B, the jitter value at the point A is set as an equalizer adjustment value in step S39. If it is decided in step S38 that the jitter value at the point A is more than the jitter value at the point B, the jitter value at the point B is set as the equalizer adjustment value in step S40.

If it is decided in step S32 that the jitter value at each of the points A and B is equal to or more than 16%, the measuring points A and B are moved by the measuring point moving unit 225 to (Fc+1, Bst−1) and (Fc−1, Bst+1), respectively. Then, jitter values are measured at these measuring points in step S33. That is, if it is decided in step S32 that the jitter value at each of the points A and B is equal to or more than about 16%, it is judged that the points A and B are outside the bottom. Then, the points A and B are moved to (Fc+1, Bst−1) and (Fc−1, Bst+1), respectively. Subsequently, the measurement of jitter is performed again at each of these points. Then, if the jitter values are equal to or more than about 16%, the linearity of the value is lost, so that the measurement of the jitter value is performed again. Subsequently, the apparatus proceeds to step S51 shown in a flowchart of FIG. 5.

Also, if it is judged in step S34 that the difference in jitter between the points A and B is equal to or more than 0.5%, and that the jitter value at each of the points A and B is more than 10%, the apparatus also advances to step S51.

Figure 5:
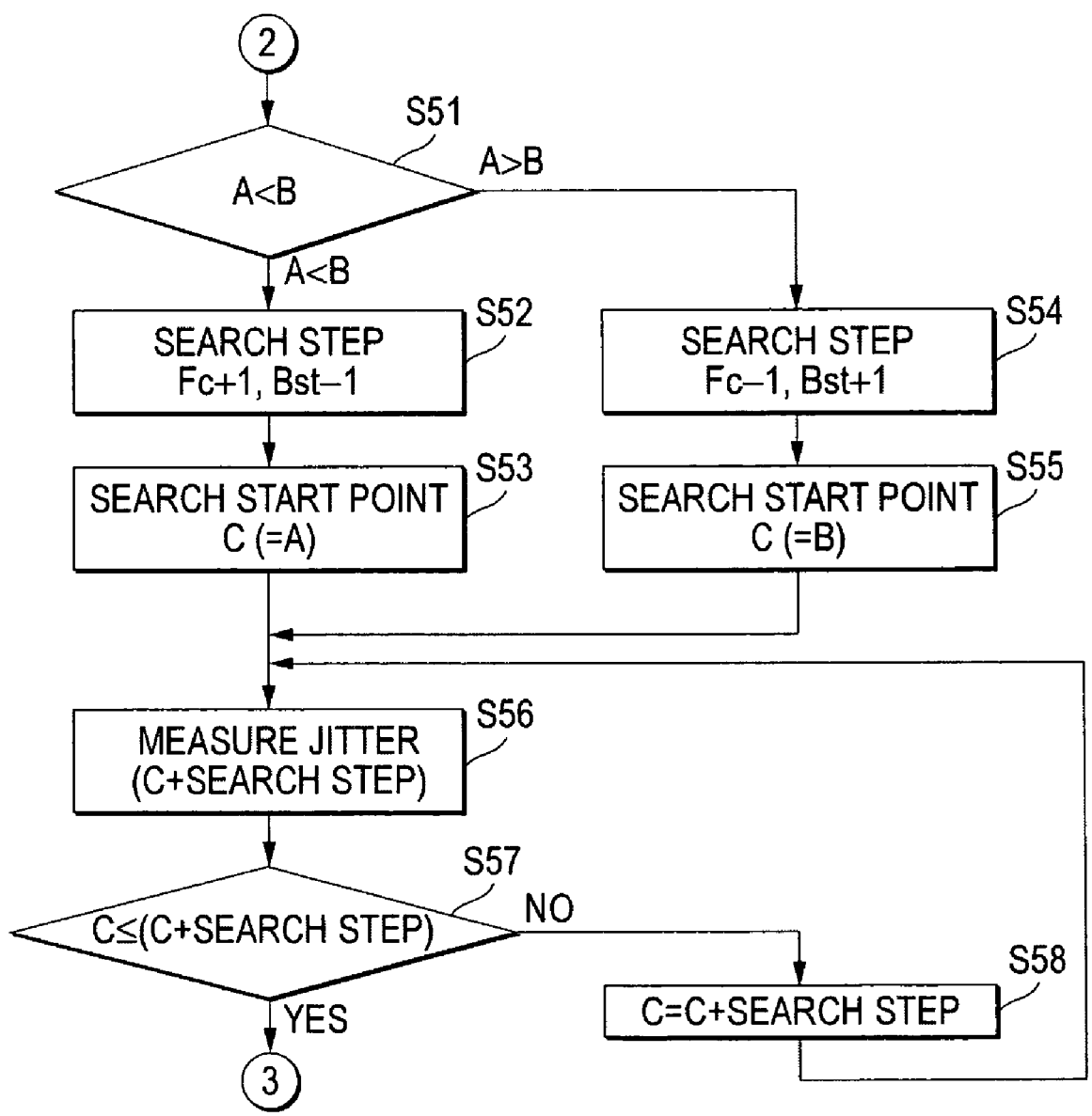
FIG. 5 is a flowchart illustrating a process step S33 or S34 shown in FIG. 4.

If it is decided in step S34 shown in FIG. 4 that the difference in jitter between the points A and B is equal to or more than 0.5%, or that the jitter value at each of the points A and B is equal to or more than 10%, a search step is set at <Fc+1, Bst−1> in step S52 shown in FIG. 5 if it is decided in step S51 that the jitter value at the point A is smaller than the jitter value at the point B. Conversely, a search step is set at <Fc−1, Bst+1> in step S54 shown in FIG. 5 if it is decided in step S51 that the jitter value at the point B is smaller than the jitter value at the point A. The point A or B, at which the jitter value is better than the jitter value at the other point, is set as a temporary point C and also as a search start point in steps S53 and S55.

Subsequently, the search step is advanced by 1, and jitter is measured in step S56. The jitter value measured this time is compared with the jitter value measured the last time (the jitter value measured at a first time is the jitter value at the point A or B) in step S57. If the jitter value measured this time is less than the jitter value measured the last time, a point indicating the jitter value measured this time is set as a point C. Then, the apparatus returns to step S56 from step S58. Incidentally, if the jitter value measured this time is more than the jitter value measured the last time, the jitter value measured the last time is set as the jitter value at the bottom. This point is set as the point C.

If it is decided in step S36 that the jitter value at the point C is smaller than a value obtained by subtracting 0.25% from the jitter value at the point A, and smaller that the jitter value at the point B, a flag is set at the point C (=A+1).

Figure 6:
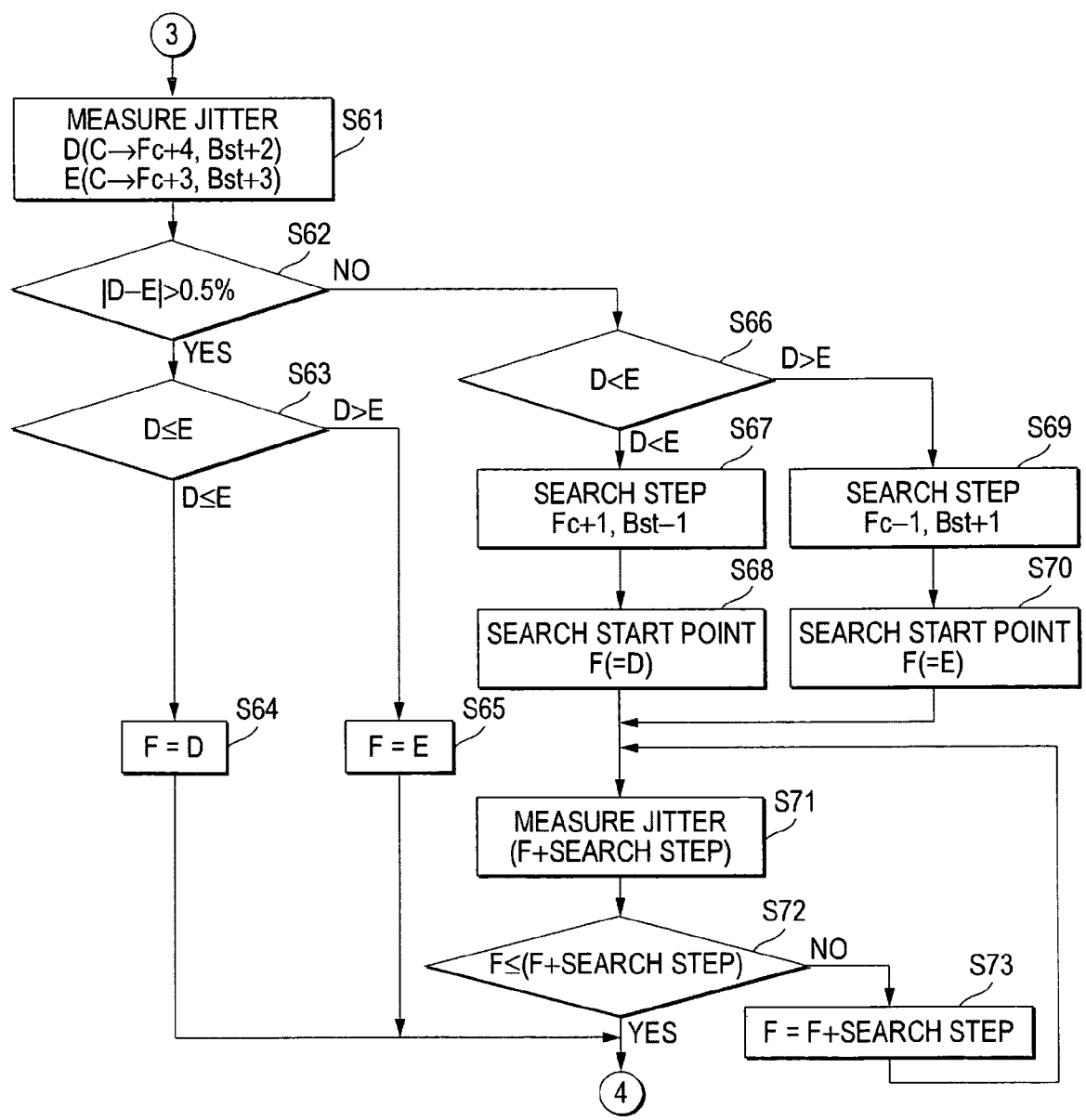
FIG. 6 is a flowchart illustrating a process following step S37 shown in FIG. 4 or step S57 shown in FIG. 5.

Then, the apparatus proceeds to step S61 shown in FIG. 6. That is, a jitter value at a point (Fc+1, Bst+1) displaced from the point A is measured. If the jitter value at the point (Fc+1, Bst+1) is better than any of the jitter values measured at the points A and B (that is, better than the adjustment value), and differs by about 0.25% or more from the jitter value at the point A, it is judged that there is a point at which a better jitter value is measured. Then, this point is set as the point C. The apparatus starts processing in step S61 shown in the flowchart of FIG. 6.

As shown in FIG. 6, a jitter value is measured at a point D (Fc+4, Bst+2) displaced from the point C and at a point E (Fc+3, Bst+3) displaced therefrom in step S61. If it is decided in step S62 that the difference in jitter value between the points D and E is less than about 0.5%, the second jitter bottom judging unit 226 judges that these points are placed at the jitter bottom. Then, the point D or E, the measured jitter value at which is better than the jitter value measured at the other point E or D, is set as a point F in steps S63, S64, and S65. Subsequently, the apparatus advances to step S81 shown in a flowchart of FIG. 7.

If it is decided in step S62 that the difference in jitter value between the points D and E is equal to or more than about 0.5%, and if it is judged in step S66 that the jitter value at the point D is less than the jitter value at the point E, a search step is set at <Fc+1, Bst−1> in step S67. Then, the point D is set as a search start point in step S68. Conversely, if it is decided in step S66 that the jitter value at the point E is less than the jitter value at the point D, a search step is set at <Fc−1, Bst+1> in step S69. Then, the point E is set as a search start point in step S70.

Subsequently, the search step is advanced by 1, and jitter is measured in step S71. The jitter value measured this time is compared with the jitter value measured the last time (the jitter value measured at a first time is the jitter value at the point D or E) in step S72. If the jitter value measured this time is less than the jitter value measured the last time, a point indicating the jitter value measured this time is set as a point F. Then, the apparatus returns to step S71 through step S73. Incidentally, if the jitter value measured this time is more than the jitter value measured the last time, a point, at which the jitter value measured the last time is indicated, is placed at the bottom. This point is set as the point F. Then, the apparatus advances to step S81 shown in the flowchart of FIG. 7.

Figure 7:
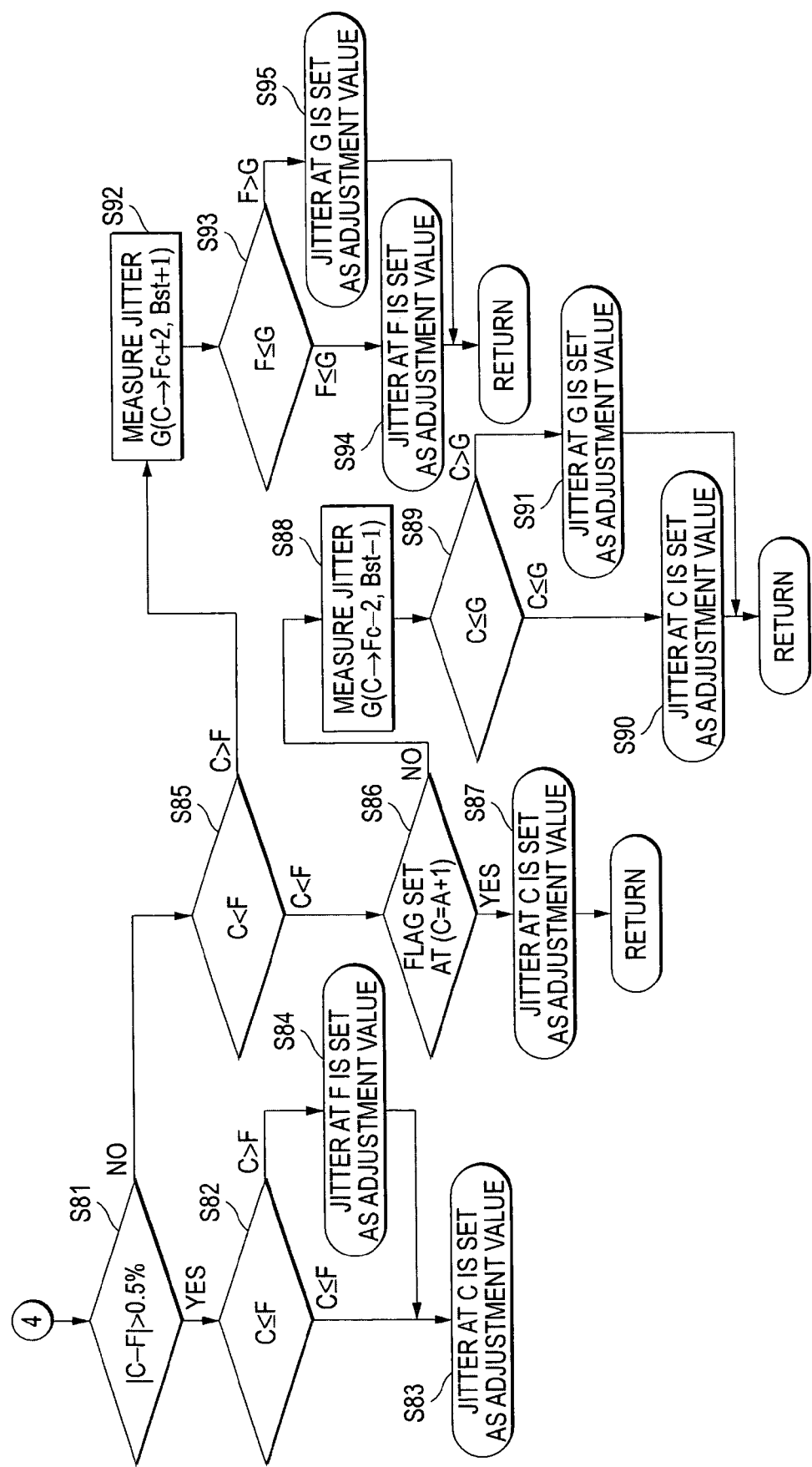
FIG. 7 is a flowchart illustrating a process following step S64, S65 or S72 shown in FIG. 6.
Figure 8:
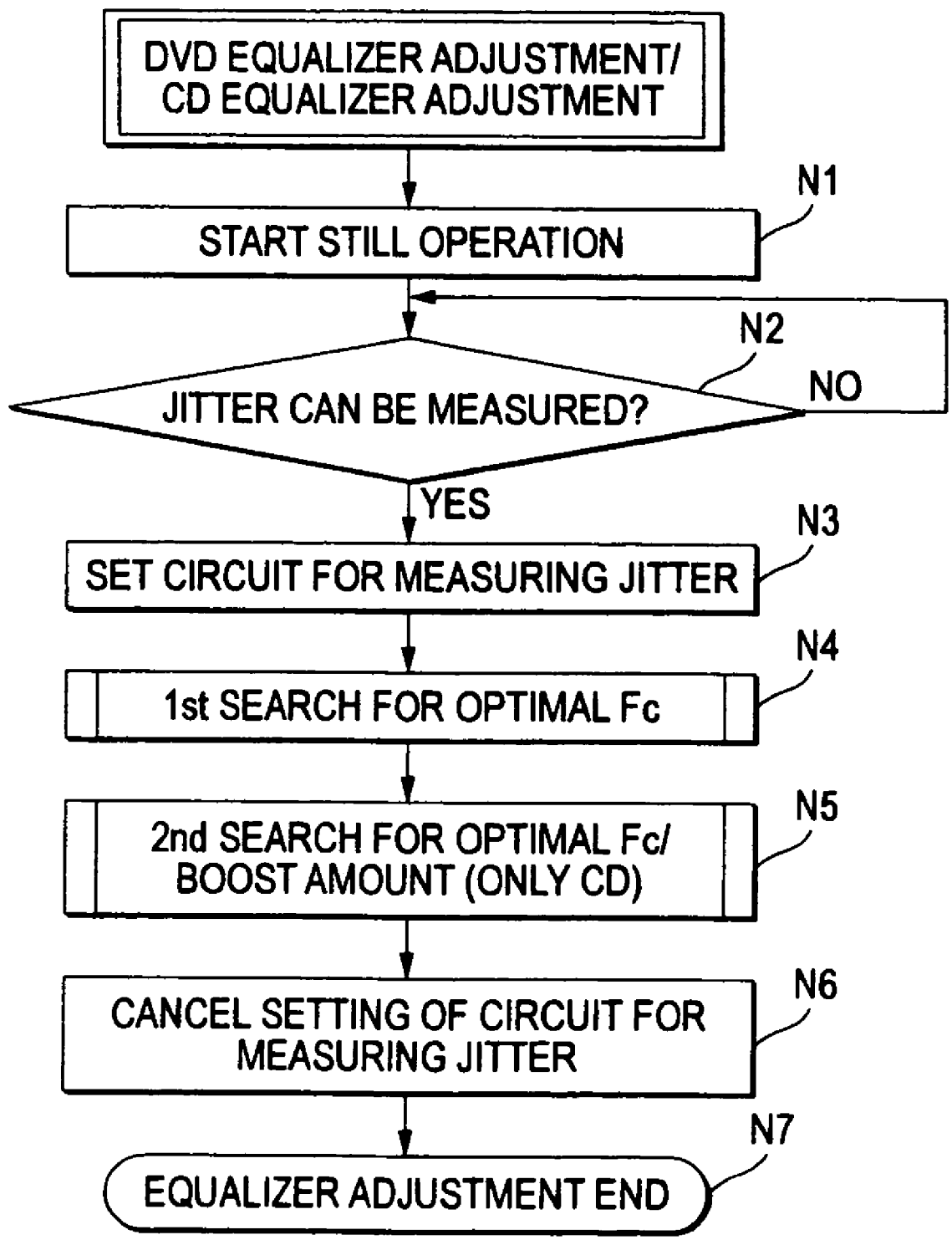
FIG. 8 is a flowchart illustrating equalizer adjustment in a conventional optical disc reproducing apparatus.
Figure 9A:
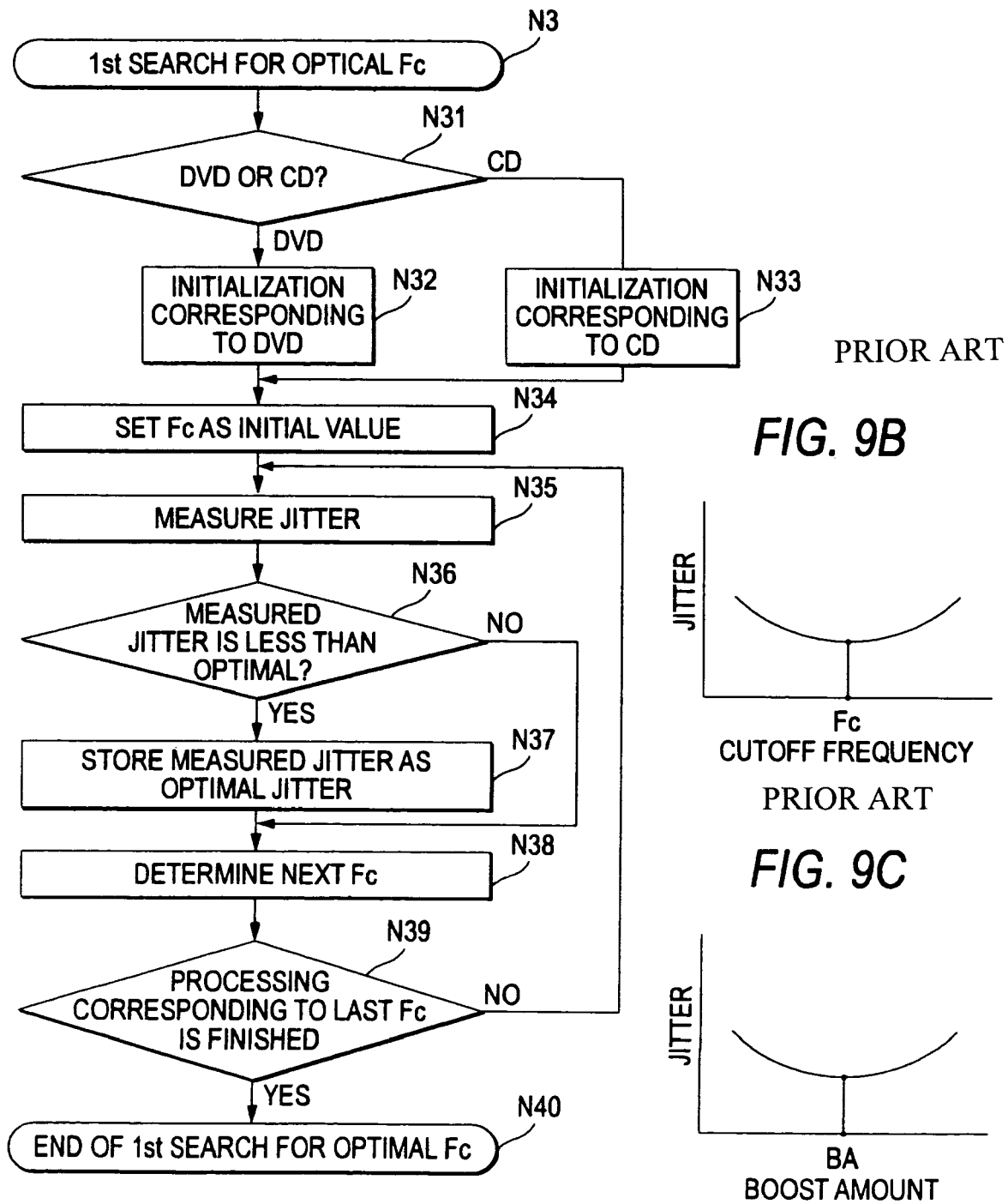
FIG. 9A is a flowchart illustrating a first search for an optimal cutoff frequency.
Figure 9B:
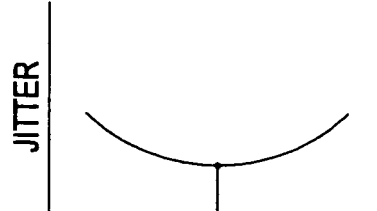
FIG. 9B and FIG. 9C are diagrams showing an optimal jitter.
Figure 9C:
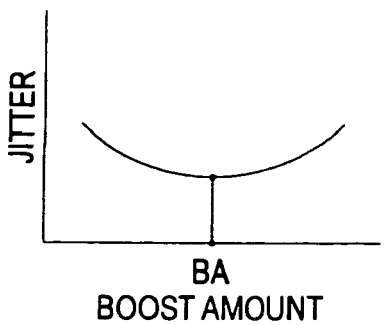
Figure 10:
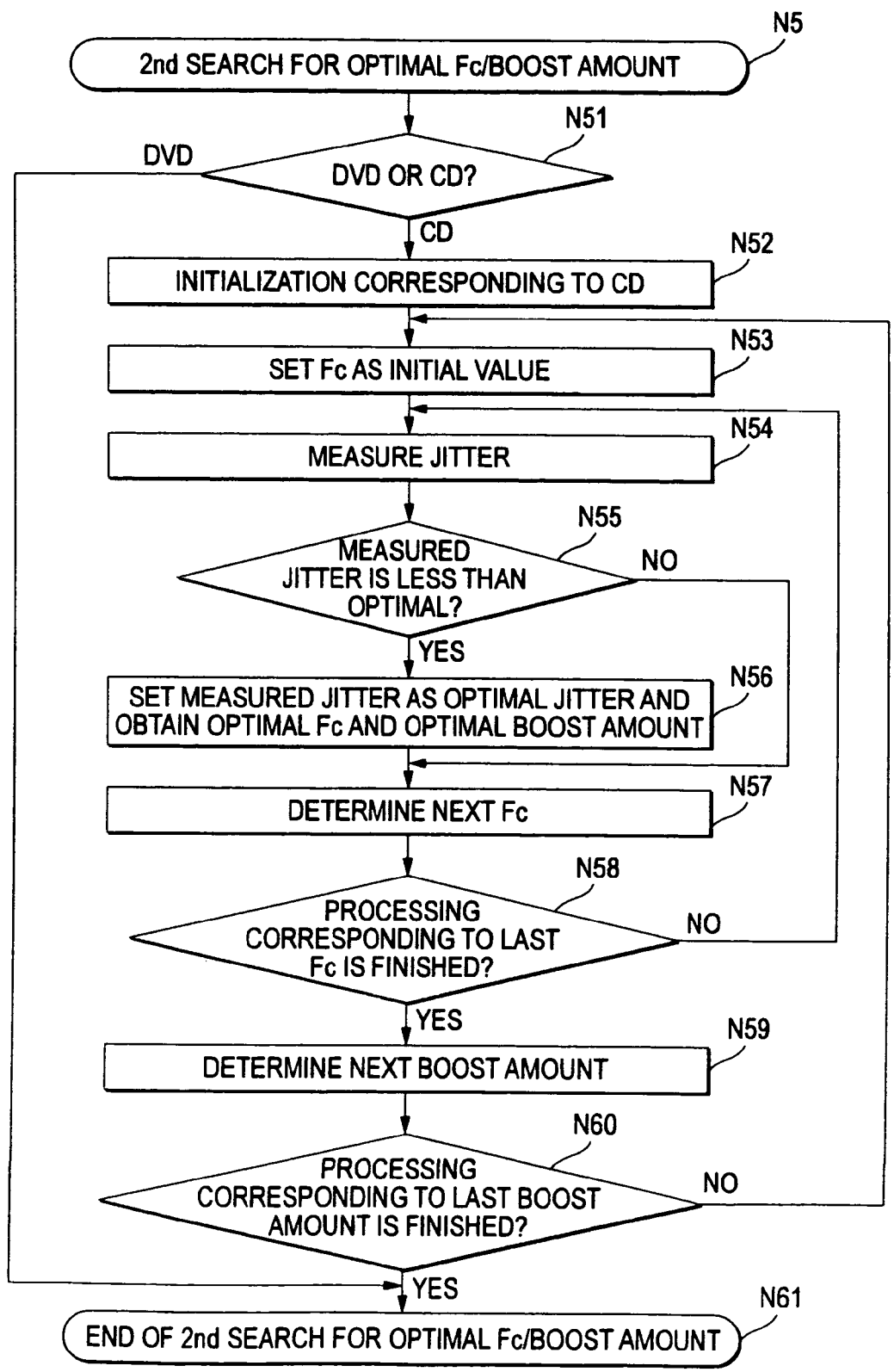
FIG. 10 is a flowchart illustrating a second search for an optimal cutoff frequency and a boost amount.

As shown in FIG. 7, the jitter value at the point C is compared with the jitter value at the point F in step S81. If the difference in the jitter value between the points C and F is less than about 0.5%, it is judged by the second jitter bottom judging unit 226 that both the points C and F are placed at the jitter bottom. Then, the jitter value at the point C or F, which is better than the jitter value at the other point F or C, is set as an adjustment value in steps S82, S83, and S84. Conversely, if the difference in the jitter value between the points C and F is equal to or more than about 0.5%, and if it is decided in step S85 that the jitter value at the point C is smaller than that at the point F, it is judged that the point C is placed at a deeper jitter level. Then, it is checked whether there is a point at which a better jitter value is measured.

Incidentally, if this condition is satisfied and if the point C is obtained by the adjustment illustrated in the flowchart of FIG. 4, that is, adding 1 to each of the cutoff frequency Fc and the boost amount Bst at the point A, a jitter value at the point G (to be described later) is not measured. Instead, the jitter value at the point C is set as an adjustment value in step S87.

If no flag is set at the point C (=A+1) in step S86, jitter is measured at a point obtained by subtracting 2 from the cutoff frequency at the point C and by subtracting 1 from the boost amount at the point C. Then, this point is set as a point G in step S88. Subsequently, the jitter value at the point C is compared with the jitter value at the point G. The jitter value at the point C or G, which is better than the jitter value at the other point G or C, is set as an adjustment value in steps S89, S90, and S91.

If it is decided in step S81 that the difference in jitter value between the points C and F is equal to or more than about 0.5%, and if it is judged in step S85 that the jitter value at the point C is more than the jitter value at the point F, it is judged that the point F is placed at a deeper jitter level.

Then, it is checked whether there is a point at which a better jitter value is measured. Jitter is measured at a point obtained by adding 2 to the cutoff frequency at the point F and also adding 1 to the boost amount at the point F. Then, the obtained point is set as the point G in step S92. Subsequently, the jitter value at the point F is compared with the jitter value at the point G. The jitter value at the point F or G, which is better than the jitter value at the other point G or F, is set as an adjustment value in steps S93, S94, and S95.

As described above, according to this embodiment, points located on the coordinate plane, whose abscissas represent cutoff frequencies and whose ordinates represent boost amounts, are determined as measuring points. Thus, when the measuring point is moved, the cutoff frequency and the boost amount simultaneously change. Consequently, the number of times of measurement can be reduced. Optimal jitter can be searched for. Deviations of the cutoff frequency and the boost amount of a circuit can be absorbed. Optimal equalizer adjustment can be performed on each optical disc in a short time.

What is claimed is:

1. An optical disc reproducing apparatus having a function of setting a cutoff frequency and a boost amount of a read out signal from an optical disc and performing equalizer adjustment, comprising:

an optical pickup for generating the read out signal;

a system controller to search an optimal jitter by simultaneously changing cutoff frequency and the boost amount thereby performing the equalizer adjustment, the system controller comprising:

the optical pickup setting unit for causing an optical pickup to seek a predetermined address on the optical disc to measure jitter and for setting the optical pickup in a pause state;

a measuring point setting unit to sequentially set at least two points, and to measure a jitter at each point, the two points being located on a coordinate plane whose abscissa represents cutoff frequencies and whose ordinate represents boost amounts, wherein one of the two points is set as a reference search point and the other one of the two points is set at a position displaced by a set value from the reference search point;

a first jitter bottom judging unit to check whether jitter values at the two points satisfy a filtering condition, wherein when the jitter values at the two points fail to satisfy the filtering condition, the two points are judged to be outside of a bottom of a jitter coordinate space and the two points are updated to different locations, wherein when the jitter values at the two points satisfy the filtering condition and when a difference in a jitter value between the two points is within a predetermined range, the two points are judged to be at the bottom of the jitter coordinate space;

a first adjustment value setting unit to set an equalizer adjustment value when the two points are judged to be placed at the bottom of the jitter coordinate space, wherein the equalizer adjustment value is one of the jitter values having a value less than or equal to the other one;

a measuring point moving unit configured to update the two points when the two points fail to satisfy the filtering condition, and configured to update one of the two points when the difference in the jitter value judges that the two points are outside the predetermined range, wherein the one of the two points having a larger jitter value is updated by moving to a different point by a set value;

a second jitter bottom judging unit to judge that the point being moved and the other point are placed at the bottom of the jitter coordinate space when a difference in a jitter value between a jitter at the point being moved and the jitter at the other point is within the predetermined range; and a second adjustment value setting unit to set the equalizer adjustment value when the point being moved and the other point are judged to be placed at the bottom of the jitter coordinate space, wherein the equalizer adjustment value is one of the jitter values having a value less than or equal to the other one.

* * * * *